(12) United States Patent
Tahon et al.

(10) Patent No.: US 9,373,113 B2
(45) Date of Patent: Jun. 21, 2016

(54) PAYMENT TERMINAL SHARING

(71) Applicant: Amadeus S.A.S., Biot (FR)

(72) Inventors: Mathieu Tahon, Madrid (ES); Lorenzo Bosco, Nice (FR); Nicolas Hirel, Biot (FR); Veronica Milani, Juan les Pins (FR); Remi Diana, Antibes (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 14/484,356

(22) Filed: Sep. 12, 2014

(65) Prior Publication Data

US 2016/0078437 A1  Mar. 17, 2016

(51) Int. Cl.
*G07F 19/00* (2006.01)
*G06Q 20/40* (2012.01)
*H04L 9/14* (2006.01)

(52) U.S. Cl.
CPC .............. *G06Q 20/401* (2013.01); *H04L 9/14* (2013.01); *G06Q 2220/10* (2013.01); *H04L 2209/24* (2013.01)

(58) Field of Classification Search
CPC ... G07F 19/20; G07F 7/1008; G06Q 20/1085; G06Q 20/341; B42D 15/10
USPC ........................ 235/379, 380, 382, 382.5, 487
See application file for complete search history.

(56) References Cited

U.S. PATENT DOCUMENTS

| | | | |
|---|---|---|---|
| 5,745,576 A | 4/1998 | Abraham et al. | |
| 6,128,391 A | 10/2000 | Denno et al. | |
| 7,159,114 B1 | 1/2007 | Zajkowski | |
| 8,737,623 B2 * | 5/2014 | Hart | G06Q 20/3552 380/270 |
| 2014/0129439 A1 | 5/2014 | Suisa | |

FOREIGN PATENT DOCUMENTS

EP  2541517  1/2013

OTHER PUBLICATIONS

B.V. Nxp, "AN10922 Symmetric key diversifications", Mar. 17, 2010, Retrieved from the Internet: URL:http://www.nxp.com/documents/application_note/AN10922.pdf [retrieved on Nov. 7, 2014].

(Continued)

*Primary Examiner* — Karl D Frech
(74) *Attorney, Agent, or Firm* — Thompson Hine LLP

(57) ABSTRACT

Methods, systems, and computer program products for payment terminal sharing. A payment terminal is configured to become usable as a payment terminal shared by a plurality of operators with cryptographic segregation between the different operators of the payment terminal. An operator- and terminal-specific transport key is provided to the payment terminal. An operator- and terminal-specific initial-encryption key is derived, by the payment provider, from an operator-specific base-derivation key using the terminal-identification number, or an additional identification number of the payment terminal. The operator- and terminal-specific initial-encryption key is transmitted to the payment terminal, and is decrypted at the payment terminal. An operator- and transaction-specific encryption key is derived, both at the payment provider and the payment terminal, from the operator- and terminal-specific initial-encryption key using a transaction-specific number associated with this transaction, when performing a transaction with the payment terminal.

19 Claims, 6 Drawing Sheets

(56) References Cited

OTHER PUBLICATIONS

European Patent Office, Search Report issued in Application No. EP 14290273 dated Feb. 25, 2015.

International Searching Authority, International Search Report and Written Opinion issued in corresponding Application No. PCT/EP2015/001831 dated Dec. 7, 2015, 14 pages.

* cited by examiner

PAYMENT TERMINAL SHARING

BACKGROUND

The present invention generally relates to computers and computer software and, in particular, to methods, systems, and computer program products for payment terminal sharing.

Cashless payment at vendors can be performed at payment terminals by means of payment cards, e.g., credit cards. Payment terminals typically enable payment card industry (PCI) compliant point-to-point transactions to be performed. Such payment terminals, for example, are also used at airports for ticket purchase at ticket counters, and also for last-minute purchases, for example, at boarding gates.

Improved methods, systems, and computer program products are needed for updating a server database of a centralized mid-back office system for payment terminal sharing.

SUMMARY

Embodiments of the invention are directed to methods, systems, and computer program products for payment terminal sharing.

In an embodiment, a method is provided of configuring a payment terminal to become usable as a payment terminal shared by a plurality of operators with cryptographic segregation between the different operators of the payment terminal. The payment terminal is arranged to communicate with at least one payment provider to perform payment transactions. The payment terminal is associated with a controlling entity that controls usage of the payment terminal in an operator-selective manner. The payment terminal has a terminal-specific access key stored therein, and has a terminal-identification number. The method comprises providing an operator- and terminal-specific transport key, encrypted by the terminal-specific access key, to the payment terminal. The encrypted operator- and terminal-specific transport key is decrypted at the payment terminal with the stored terminal-specific access key. An operator- and terminal-specific initial-encryption key is derived, by the payment provider, from an operator-specific base-derivation key using the terminal-identification number, or an additional identification number of the payment terminal. The operator- and terminal-specific initial-encryption key is symmetrically encrypted with the operator- and terminal-specific transport key. The encrypted operator- and terminal-specific initial-encryption key is transmitted to the payment terminal. The encrypted operator- and terminal-specific initial-encryption key is decrypted at the payment terminal with the decrypted operator- and terminal-specific transport key. An operator- and transaction-specific encryption key is derived, both at the payment provider and the payment terminal, from the operator- and terminal-specific initial-encryption key using a transaction-specific number associated with this transaction, when performing a transaction with the payment terminal.

According to another embodiment, a computerized controlling-entity system is provided arranged to configure a payment terminal to be usable as a payment terminal shared by a plurality of operators with cryptographic segregation between the different operators of the payment terminal. The payment terminal has a terminal-identification number. The controlling-entity system is arranged to derive an operator- and terminal-specific transport key from an operator-specific master-transport key by using the terminal-identification number. The controlling-entity system is further arranged to symmetrically encrypt the operator- and terminal-specific transport key with a terminal-specific access key and to transmit the encrypted operator- and terminal-specific transport key to the payment terminal.

According to a further embodiment, a computerized payment-provider system is provided arranged to configure a payment terminal to be usable as a payment terminal shared by a plurality of operators with cryptographic segregation between the different operators of the payment terminal. The payment terminal has a terminal-identification number. The payment-provider system is arranged to derive an operator- and terminal-specific transport key from an operator-specific master-transport key by using the terminal-identification number and to derive an operator- and terminal-specific initial-encryption key from an operator-specific base-derivation key by using the terminal-identification number, or an additional identification number of the payment terminal. The payment-provider system is arranged to transmit the operator-specific master-transport key to a controlling entity in a confidentiality-securing manner, wherein the payment terminal is associated with the controlling entity, or, alternatively; to transmit the operator- and terminal-specific transport key to the controlling entity in a confidentiality-securing manner. The payment-provider system is further arranged to symmetrically encrypt the operator- and terminal-specific initial-encryption key with the operator- and terminal-specific transport key and to transmit the encrypted operator- and terminal-specific initial-encryption key to the payment terminal; and to derive an operator- and transaction-specific encryption key from the operator- and terminal-specific initial-encryption key using a transaction-specific identification number associated with the transaction, when performing a transaction with the payment terminal.

According to a still further embodiment, a payment terminal is provided programmed to be usable as a payment terminal shared by a plurality of operators with cryptographic segregation between the different operators of the payment terminal and arranged to communicate with an operator or at least one payment provider to perform payment transactions and arranged to be associated with a controlling entity that controls usage of the payment terminal in an operator-selective manner. The payment terminal comprises at least one tamper-resistant security module arranged to store a terminal-specific access key to enable usage of the payment terminal to be controlled by the controlling entity in the operator-selective manner.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
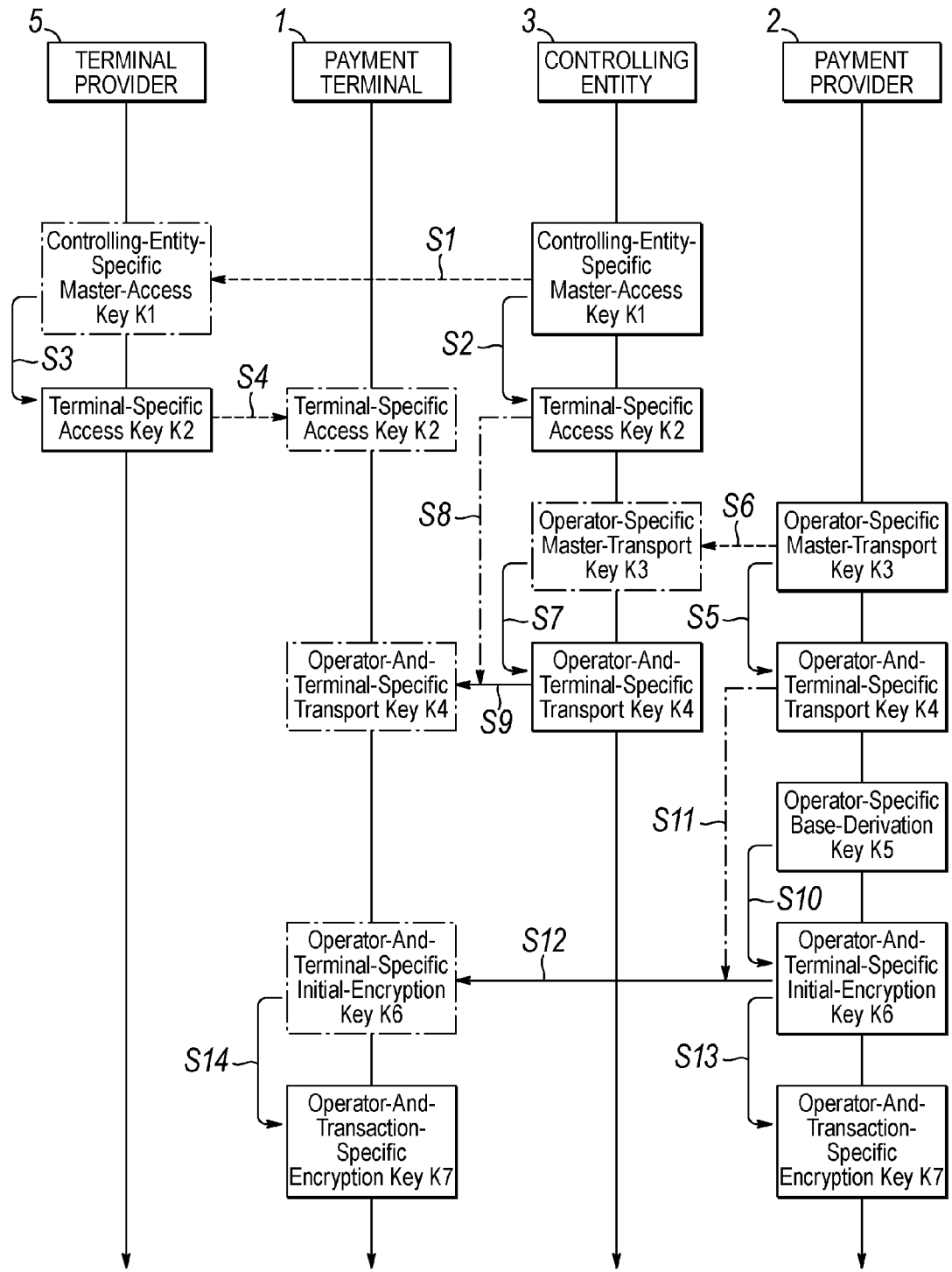
FIG. 1 is a diagrammatic view summarizing cryptographic key generations, derivations, and exchanges between different payment-transaction actors.

Generally, a payment terminal, for example a credit-card reader, may be configured to become usable as a payment terminal shared by a plurality of operators with cryptographic segregation between the different operators of the payment terminal. Such an operator is, for example, an airline performing a check-in for a flight.

The cryptographic segregation allows usage, i.e., transmitting payment transactions, of the same payment terminal by the different operators, e.g., different airlines at a boarding gate, secured with operator-specific encryption keys, thereby ensuring operator-specific privacy, such as if each of these operators were the only operator using that payment terminal.

The payment terminal is arranged to communicate with at least one payment provider to perform payment transactions. The payment provider, for example, can be a payment gateway, a credit card company (a credit card company is also referred to as a "switch"), or an acquirer. A payment gateway may bundle transactions with various credit card companies.

The payment terminal is associated with a controlling entity that controls usage of the payment terminal in an operator-selective manner. The controlling entity may be an airport owner that commissioned the payment terminals for an airport. An airport company managing the airport may order payment terminals from a manufacturer to distribute the payment terminals throughout check-in desks, boarding gates, kiosks, and the like.

The controlling entity grants usage to the different operators by using a terminal-specific access key, which allows the controlling entity to manage access authorization for each individual operator of the payment terminal. That is to say, the authorization of payment providers contracted by the operators, i.e., acquirers of the operators, can be controlled by the controlling entity in this manner. More specifically, the authorization of an operator is established by providing the payment terminal with an operator- and terminal-specific transport key, encrypted by the terminal-specific access key.

In some examples, the operator- and terminal-specific transport key is verified after decryption by the terminal-specific access key with a key control value (KCV), which is also transmitted along with the encrypted operator- and terminal-specific transport key. The KCV is, for example, the result of an application of a "one-way function" to the operator- and terminal-specific transport key to be verified. A "one-way function" is a function which cannot practically be inverted; that is, a function which does not enable the input data which is due to be verified to be reconstructed from the result of the application of the one-way function to the input data. Examples of one-way functions are hash functions. To verify the operator- and terminal-specific transport key, the one-way function (e.g., a hash function) is applied to the decrypted operator- and terminal-specific transport key, and the result of the application is compared to the transmitted KCV. If the result is consistent with the KCV (e.g., if it is identical to the KCV), the operator- and terminal-specific transport key is deemed to be the valid operator- and terminal-specific transport key.

In other examples (without verification by a KCV), the validity of the decrypted operator- and terminal-specific transport key becomes evident during a subsequent payment transaction. If a bit sequence, i.e., a (presumed) operator- and terminal-specific transport key, not encrypted by the correct terminal-specific access key, is transmitted to the payment terminal, the decrypted bit sequence, i.e., the (presumed) operator- and terminal-specific transport key resulting from the decryption with the stored terminal-specific access key, will not be the correct operator- and terminal-specific transport key. Hence, all the keys derived from this incorrect operator- and terminal-specific transport key will also be incorrect. Therefore, communications encrypted by those derived incorrect keys, e.g., user or cardholder authentication requests, made by the payment terminal in the subsequent payment transaction, will not contain any useful information, and will therefore fail.

The payment terminal has a terminal-identification number, i.e., a string of alphanumeric digits of a given length, and has the terminal-specific access key stored within it, e.g., stored in a read-only memory (ROM).

The process of providing the payment terminal with an operator- and terminal-specific transport key, encrypted by the terminal-specific access key, can be performed in various alternative ways, denoted below by "A1", "A2", and "A3". The beginning and end of the description of these alternatives is marked by "(StartA1)", "(EndA1)", "(StartA2)", etc.

(StartA1) In some embodiments, an operator-specific master-transport key is transmitted from at least one payment provider to the controlling entity in a confidentiality-securing manner.

This operator-specific master-transport key is unique per operator and controlling entity. The operator-specific master-transport key may be generated securely in the payment provider's tamper-resistant security module (TRSM) and then communicated to the controlling entity in the confidentiality-securing manner. The controlling entity stores the operator-specific master-transport key, for example, in another tamper-resistant security module (TRSM).

An operator- and terminal-specific transport key is derived, both at the payment provider's end and the controlling entity's end, e.g., in the respective TRSMs, from the operator-specific master-transport key using the terminal-identification number, which may be a serial number of the payment terminal.

The operator- and terminal-specific transport key, derived by the controlling entity is symmetrically encrypted, with the terminal-specific access key and then the encrypted operator- and terminal-specific transport key is transmitted to the payment terminal. (End A1)

(Start A2) In alternative embodiments, an operator-specific master-transport key that is unique to each operator and controlling entity is, for example, generated securely in the payment provider's tamper-resistant security module (TRSM).

An operator- and terminal-specific transport key is derived, at the payment provider's end, e.g., in the TRSM, from the operator-specific master-transport key using the terminal-identification number, and is transmitted to the controlling entity in a confidentiality-securing manner.

This operator- and terminal-specific transport key is symmetrically encrypted, by the controlling entity, with the terminal-specific access key and then the encrypted operator- and terminal-specific transport key is transmitted to the payment terminal (End A2)

(Start A3) In other alternative embodiments, the operator- and terminal-specific transport key may be provided to the payment terminal by manually inputting the operator- and terminal-specific transport key, symmetrically encrypted by the terminal-specific access key, into the payment terminal.

This manual input can be a manual interaction with the payment terminal, e.g., navigating through the payment terminal's guided menu and entering the operator- and terminal-specific transport key, encrypted with the terminal-specific access key, in binary-coded decimal (BCD) format. Alternatively, the manual input can be an insertion of a removable storage device into the payment terminal, for example, an USB flash drive or a memory card. (End A3)

In all these alternatives (A1, A2, A3), the controlling entity is able to control the usage of the payment terminal in the operator-selective manner with the operator- and terminal-specific transport key, as this key is used for decryption of subsequent communications between a payment provider and the payment terminal if an operator, associated with that payment provider, initiates a payment transaction.

On the one hand, the use of symmetrical encryption for the operator- and terminal-specific transport key permits less complex key management than, for example asymmetric encryption, as there is no independent certificate authority (CA) required to manage distribution of verified public keys. On the other hand, the transmission of the symmetric key is acceptable from the security perspective since a "shared secret" is derived at both ends of the transmission and can, as described above, be verified with a KCV or the like. Furthermore, the initial cryptographic key, used for both encryption and decryption of subsequent keys transmitted to the payment terminal, is fed into the payment terminal in confidentiality-securing manner, for example, within a secure room located at the terminal provider's manufacturing facilities.

The security modules mentioned above may be storage devices with physical characteristics that make successful tampering difficult and improbable. Tampering might include penetration without zeroization of security parameters, unauthorized modification of an internal operation of the TRSM, or insertion of tapping mechanisms or non-intrusive eavesdropping methods to determine, record, or modify secret data.

The encrypted operator- and terminal-specific transport key is decrypted at the payment terminal with the stored terminal-specific access key, as described above.

In some embodiments, the encrypted operator- and terminal-specific transport key may be decrypted with the terminal-specific access key at the payment terminal upon receipt, and the decrypted operator- and terminal-specific transport key is stored in a secure storage of the payment terminal, such as the TRSM.

In other embodiments, the received encrypted operator- and terminal-specific transport key may be initially stored in the payment terminal in its encrypted form and is only later decrypted with the terminal-specific access key at the payment terminal "on the fly", i.e., only when the decrypted version of the operator- and terminal-specific transport key is required for the decryption of the encrypted operator- and terminal-specific initial-encryption key to perform a transaction with the payment terminal, e.g., a payment transaction.

The controlling entity can grant usage of the payment terminal to an operator with the corresponding operator- and terminal-specific transport key as this key is used for decryption of subsequent communication between the payment terminal and the payment provider associated with the operator performing transactions with the payment terminal.

An operator- and terminal-specific initial-encryption key is derived, by the payment provider, from an operator-specific base-derivation key using the terminal-identification number, or an additional identification number of the payment terminal The operator-specific base-derivation key, for example, may be unique to each operator and payment provider and is generated securely in the payment provider's TRSM and, in normal circumstances, never leaves this secure environment. The operator- and terminal-specific initial-encryption key is unique to each payment terminal and is generated, for example, in the payment provider's TRSM by derivation from the operator-specific base-derivation key using derivation data based on the terminal-identification number of the payment terminal.

The operator- and terminal-specific initial-encryption key is symmetrically encrypted with the operator- and terminal-specific transport key. The encrypted version of that key is transmitted to the payment terminal. The encrypted version received at the payment terminal is decrypted at the payment terminal using the previously stored operator- and terminal-specific transport key.

In some embodiments, the decrypted version of the operator- and terminal-specific initial-encryption key may be stored in a secure storage of the payment terminal, for example, in the payment terminal's TRSM.

In some embodiments, the encrypted operator- and terminal-specific initial-encryption key may be decrypted with the operator- and terminal-specific transport key at the payment terminal upon receipt or input, and the decrypted operator- and terminal-specific initial-encryption key may be stored in a secure storage of the payment terminal, for example the TRSM.

The process of transmitting the encrypted operator- and terminal-specific initial-encryption key, decrypting the encrypted operator- and terminal-specific initial-encryption key, and storing the decrypted operator- and terminal-specific initial-encryption key in the payment terminal can be considered to be a process of feeding (or, figuratively speaking, "injecting") the operator- and terminal-specific initial-encryption key into the payment terminal.

In an alternative embodiment, the received encrypted terminal-specific initial-encryption key may be initially stored in the payment terminal in its encrypted form upon receipt or input and is only later decrypted with the operator- and terminal-specific transport key at the payment terminal when the decrypted terminal-specific initial-encryption key is required for obtaining the operator- and transaction-specific encryption key using the decrypted operator- and terminal-specific initial-encryption key to perform a transaction with the payment terminal, e.g., a payment transaction.

In this alternative embodiment, the operator- and terminal-specific initial-encryption key may be stored while in its encrypted form in the payment terminal in a not secure (i.e., an unsecure) memory, e.g., a normal memory outside the TRSM, and is only decrypted when needed, i.e., it is "decrypted on the fly". In this alternative embodiment, security for the operator- and terminal-specific initial-encryption key is provided by encryption, rather than by storing it in the unencrypted form in a secure memory, such as a TRSM. In this alternative embodiment, the feeding (or the "injection") of the operator- and terminal-specific initial-encryption key process into the payment terminal can be seen in the transmission of the encrypted operator- and terminal-specific initial-encryption key to the payment terminal, and its storage in the still encrypted form in the payment terminal. The later decryption of this key "on the fly" can be considered to be part of the subsequent activity of deriving an operator- and transaction-specific encryption key.

An operator- and transaction-specific encryption key may be derived, both at the payment provider's end and at the payment terminal, from the operator- and terminal-specific initial-encryption key using a transaction-specific number associated with this transaction, when a transaction is performed with the payment terminal. Such a transaction would be performed when e.g., cashless payment is made by means of a payment card, such as a credit card, being inserted into the payment terminal, for example for ticket purchase at the ticket counter of an airport, or for a last-minute purchase, for example, at a boarding gate of an airport.

In some embodiments, the "at least one payment provider" is a single payment-gateway provider that, for example, validates airline payments, combats fraud and enables fund collection. The payment-gateway provider may allow the airline to protect revenue via various checks of booking and/or payment data. The single payment-gateway provider may provide an interface to a plurality of credit-card companies, banks, etc., and can therefore be considered to be a mediator between the operator of the payment terminal and the various credit-card companies, banks, etc., and bundles the communications with the various credit-card companies, banks, etc. Hence, in the payment transactions the operator of the payment terminal transacts only indirectly with the various credit card companies, banks, etc. through the single payment-gateway provider.

In other embodiments, the "at least one payment provider" is one of a plurality of payment providers, e.g., a credit-card company that settles payments with the operator of the payment terminal. In these other embodiments, the operator of the payment terminal interacts directly with the various credit-card companies, banks, etc., without the bundling effect mentioned for the case of a single payment-gateway provider.

In some embodiments, at least one of the terminal-specific access key, the operator-specific master-transport key, the operator- and terminal-specific transport key, the operator-specific base-derivation key, the operator- and terminal-specific initial-encryption key, and the operator- and transaction-specific encryption key is a symmetric-encryption key. In some embodiments, some or all of these keys are symmetric-encryption keys.

Symmetric-encryption key in this context stands for usage of the same cryptographic keys for both encryption of plaintext and decryption of ciphertext. The encryption and decryption keys may be identical or there may be a simple transformation between them as, for example, in the International Data Encryption Algorithm (IDEA). The keys, in practice, represent a shared secret between two or more parties that can be used to maintain a private information link.

In some of these embodiments, the at least one of, some of, or all of the symmetric-encryption keys are triple keys according to the Triple Data Encryption Algorithm (TDEA), which applies the Data Encryption Standard (DES) cipher algorithm three times to each data block.

DES is a block cipher and encrypts data in 64-bit blocks. A 64-bit block of plaintext is input into the algorithm, and a 64-bit block of ciphertext is output. DES is symmetric: In principle, the same algorithm and key are used for both encryption and decryption (except for minor differences in key schedule). More specifically, DES uses keys with a key length of 56 bits. The key is usually expressed as a 64-bit number, but every eighth bit is used for parity checking and is ignored. At the simplest level, the algorithm is a combination of the two basic techniques of encryption: confusion and diffusion. The fundamental building block of DES is a combination of these techniques, i.e., a substitution followed by a permutation, on the text, based on the key. This is known as a round. DES has 16 rounds and therefore applies the same combination of techniques to the plaintext block 16 times. The algorithm uses standard arithmetic and logical operations on numbers of 64 bits at most.

Triple DES (3DES) uses a "key bundle" that comprises three DES keys, K1, K2 and K3, each of 56 bits (excluding parity bits). The procedure is as follows: DES encryption with K1, DES decryption with K2, then DES encryption with K3. Decryption is the reverse, i.e., decryption with K3, encryption with K2, then decryption with K1. Each triple encryption encrypts one block of 64 bits of data.

The 3DES standard defines three keying options: (i) all three keys are independent, (ii) K1 and K2 are independent, and K3=K1, and (iii) all three keys are identical, i.e., K1=K2=K3. Keying option 1 is strongest with 3×56=168 independent key bits. Each DES key is nominally stored or transmitted as 8 bytes, each of odd parity. So a key bundle requires 24, 16 or 8 bytes for keying option (i), (ii), or (iii), respectively.

In some embodiments, the payment terminal may be configured to provide at least two usage modes, a direct-usage mode in which transaction data is exchanged between the payment terminal and one of the operators, and a delegated-usage mode in which transaction data is exchanged between the payment terminal and at least one payment provider. The payment-terminal is pre-configured by an assignment of usage modes to operators of the plurality of operators (4). For example, considering operators A, B, C, D, E, the direct-usage mode might be assigned to the operators A, B, D, and the delegated-usage mode might be assigned to the operators C and E; and the payment terminal is pre-configured according to this assignment. When one of the operators of the plurality of operators, e.g., the operator A or the operator C, starts to use the payment terminal, e.g., to perform a transaction, the usage mode assigned to this operator, i.e., in this example the direct-usage mode and the delegated-usage mode, respectively, is automatically selected by the payment terminal, and the payment terminal performs the transaction using the selected usage mode, i.e., in this example the direct-usage mode and the delegated-usage mode, respectively.

The method described thus far began from a state in which the payment terminal has a terminal-specific access key stored therein. There are various options of how the terminal-specific access key may be obtained and stored. In some optional embodiments, the terminal-specific access key used by the controlling entity for symmetric encryption is derived from a controlling-entity-specific master-access key using the terminal-identification number, e.g., payment-terminal serial number, or an additional identification number of the payment terminal, e.g., a random number generated for each individual payment terminal. The controlling-entity-specific master-access key may be unique to each controlling entity and payment-terminal manufacturer. The controlling-entity-specific master-access key is generated securely in the controlling entity's TRSM, and is optionally transmitted to the manufacturer, i.e., the terminal provider, in a confidentiality-securing manner, and is optionally stored there in another TRSM.

In some embodiments, the terminal-specific access key may be stored in the payment terminal after being transmitted to the payment terminal in a confidentiality-securing manner by a terminal provider, i.e., the manufacturer of the payment terminal. The terminal-specific access key can be loaded into the payment terminal in a secure room at the terminal provider's, i.e., at the terminals provider's manufacturing facilities, before the payment terminal is delivered to the controlling entity.

In some embodiments, the terminal-specific access key may be derived, by the terminal provider, from a controllingentity-specific master-access key by using the terminal-identification number, or an additional identification number of the payment terminal. The terminal provider retrieves the controlling-entity-specific master-access key, for example, from a TRSM on which that key is stored.

The terminal provider may then perform a derivation operation on the controlling-entity-specific master-access key using the terminal-identification number of that payment terminal. For example, cipher block chaining may be used. The cipher block chaining (CBC) algorithm described in ISO 9797-1, for example, uses 16 bytes (length of a double length key) derivation data. This derivation can be composed of the last eight bytes (right part) of the terminal-identification number in binary coded decimals (BCD) padded with binary zeroes on the left and the first eight bytes (left part) of the terminal-identification number in binary coded decimals (BCD) padded on 8 bytes XOR [FF FF FF FF FF FF FF FF]. In this context F stands for the highest hexadecimal value and XOR stands for "exclusive or", which is a logical operation that outputs true whenever both inputs differ, i.e., one is true, the other is false.

A terminal-identification number of, for example, 123456789 yields a right part of [00 00 00 01 23 45 67 89] and a left part of [00 00 00 01 23 45 67 89] XOR [FF FF FF FF FF FF FF FF]=[FF FF FF FE DC BA 98 76]. This results in a derivation data block of [FF FF FF FE DC BA 98 76 00 00 00 01 23 45 67 89] used for the derivation of the controlling-entity-specific master-access key leading to the terminal-specific access key.

Once the key has been fed (or "injected") into the payment terminal, the payment terminal can be delivered and installed into the owner's premises.

In some embodiments, the controlling-entity-specific master-access key may be transmitted to the terminal provider in a confidentiality-securing manner by the controlling entity. The controlling entity, for example, generates the controlling-entity-specific master-access key, which is used both for deriving the terminal-specific access key at the controlling entity's end and for implantation of the terminal-specific access key into the payment terminal by the terminal provider.

In some embodiments, authorization for any number of operators and/or payment providers and thereby usage of the payment terminal by those operators and/or payment providers can be added dynamically, without physical intervention on the payment terminal. In other words, usage of the payment terminal by these operators and/or payment providers can be granted by the controlling entity remotely, without physical contact with the payment terminal Because the operator- and terminal-specific transport key is determined by the payment provider, e.g., by transmitting the master key from which the individual operator- and terminal-specific transport keys are derived or by transmitting the operator- and terminal-specific transport key itself, usage of the payment terminal by different operators is not limited to a predefined maximum number of different users.

Only the terminal-specific access key is pre-installed in the payment terminal, all other keys needed for payment transactions performed by different operators are provided to the payment terminal in subsequent encrypted transmissions. Those transmissions are encrypted with the terminal-specific access key or are encrypted with keys derived from already received keys.

In some embodiments, the confidentiality-securing manner, in which the operator-specific master-transport key is transmitted from the payment provider to the controlling entity, is an asymmetric encryption-key algorithm. Generally, a communication being sent should not be readable during transit (preserving confidentiality) and the communication should not be modifiable during transit (preserving the integrity of the communication). Combining public-key cryptography with an enveloped public key encryption (EPKE) method, allows for relatively secure communication over an open networked environment. In public-key cryptography asymmetric key algorithms are used, where a key used to encrypt a message is not the same as the key used to decrypt the message. Each user has a pair of cryptographic keys—a public encryption key and a private decryption key. The keys are related mathematically, but parameters are chosen so that calculating the private key from the public key is either impossible or prohibitively expensive.

The computerized controlling-entity system disclosed is arranged to configure a payment terminal, which has a terminal-identification number, to be usable as a payment terminal shared by a plurality of operators with cryptographic segregation between the different operators of the payment terminal.

The controlling-entity system may be arranged to derive an operator- and terminal-specific transport key from an operator-specific master-transport key by using the terminal-identification number.

The controlling-entity system may be arranged to encrypt the operator- and terminal-specific transport key symmetrically with a terminal-specific access key and transmit the encrypted operator- and terminal-specific transport key to the payment terminal In some embodiments, the computerized controlling-entity system is arranged to configure the payment terminal according to any or all of the above-mentioned examples.

The computerized payment-provider system disclosed is arranged to configure a payment terminal, which has a terminal-identification number, to be usable as a payment terminal shared by a plurality of operators with cryptographic segregation between the different operators of the payment terminal.

The payment-provider system may derive an operator- and terminal-specific transport key from an operator-specific master-transport key by using the terminal-identification number and may derive an operator- and terminal-specific initial-encryption key from an operator-specific base-derivation key also by using the terminal-identification number, or by using an additional identification number of the payment terminal.

The payment-provider system is configured to transmit the operator-specific master-transport key to a controlling entity in a confidentiality-securing manner, wherein the payment terminal is associated with the controlling entity. Alternatively, the payment-provider system is arranged to transmit the operator- and terminal-specific transport key to the controlling entity in a confidentiality-securing manner.

The payment-provider system may encrypt the operator- and terminal-specific initial-encryption key symmetrically with the operator- and terminal-specific transport key and may feed the operator- and terminal-specific initial-encryption key into the payment terminal by transmitting the encrypted operator- and terminal-specific initial-encryption key to the payment terminal The payment-provider system may derive an operator- and transaction-specific encryption key from the operator- and terminal-specific initial-encryption key using a transaction-specific number associated with the transaction, when performing a transaction with the payment terminal In some embodiments, the computerized payment-provider system is arranged to configure the payment terminal according to any or all of the above-mentioned examples.

The payment terminal disclosed is programmed to be usable as a payment terminal shared by a plurality of operators with cryptographic segregation between the different operators of the payment terminal. The payment terminal is arranged to communicate with at least one payment provider to perform payment transactions and is arranged to be associated with a controlling entity that controls usage of the payment terminal in an operator-selective manner.

The payment terminal has at least one tamper-resistant security module (TRSM) used for key management. The at least one TRSM, as mentioned above, for example, has physical characteristics that make successful tampering of information stored therein difficult and improbable, e.g., as defined in ANSI X9.24-1-2009 (Retail Financial Services Symmetric Key Management Part 1: Using Symmetric Techniques). Such physical characteristics may include, for example, a memory on which cryptographic keys are stored, which oxidizes when in contact with air, i.e., self-destructs, to make any stored cryptographic key unreadable.

The payment terminal's tamper-resistant security module(s) is (are) arranged to store an manage, within the TRSM, one or more cryptographic keys, that is at least the terminal-specific access key to enable usage of the payment terminal to be controlled by the controlling entity in the operator-selective manner.

In some embodiments, the at least one operator- and terminal-specific transport key and/or the at least one encrypted operator- and terminal-specific initial-encryption key may be decrypted at the payment terminal upon receipt or input. The at least one operator- and terminal-specific transport key and/or the at least one operator- and terminal-specific initial-encryption key may also be stored and managed within the secure memory, e.g., the TRSM. The securely stored decrypted operator- and terminal-specific transport key and/or the securely stored decrypted operator- and terminal-specific initial-encryption key is/are then readily available for the decryption of the encrypted operator- and terminal-specific initial-encryption key and/or for obtaining the operator- and transaction-specific encryption key.

In other embodiments in which the decrypted version of the operator- and terminal-specific transport key and/or the operator- and terminal-specific initial-encryption key is/are not stored in a secure storage of the payment terminal, for example, the payment terminal's TRSM, the encrypted operator- and terminal-specific transport key and/or the encrypted operator- and terminal-specific initial-encryption key can be stored a normal (unsecure) memory, and is/are only decrypted "on the fly" when needed for the decryption of the encrypted operator- and terminal-specific initial-encryption key and/or for obtaining the operator- and transaction-specific encryption key to perform a transaction with the payment terminal, e.g., a payment transaction.

In the exemplary embodiment illustrated by FIG. 1, key exchanges between the payment provider 2, e.g., the acquirer of an airline, the controlling entity 3, e.g., the airport owner, the payment-terminal manufacturer, i.e., the terminal provider 5, and the payment terminal 1 are shown.

Curved arrows indicate a derivation either by using the terminal-identification number 44 of the payment terminal 1 or a transaction-specific number 27 of an ongoing transaction 26. The key derivations based on the terminal-identification number 44 are indicated as S1, S3, S5, S7, and S10. The key derivations based on a transaction-specific number 27 are indicated as S13 and S14. Line-dotted arrows indicate symmetrical encryptions S8 and S11, whereas dotted arrows indicate secure transmissions S2, S4, and S6, e.g., by a courier. Line-dotted boxes around keys indicate sent copies of these keys.

The controlling entity 3 generates a controlling-entity-specific master-access key K1 and securely transmits S2 the controlling-entity-specific master-access key K1 to the terminal provider 5 that manufactures the payment terminals 1 for the controlling entity 3.

The terminal provider 5 stores this key, as it does with the keys of all the other controlling entities the terminal provider 5 does business with. This controlling-entity-specific master-access key K1 is unique for each controlling-entity-to-terminal-provider relation, i.e., business contract.

Figure 2:
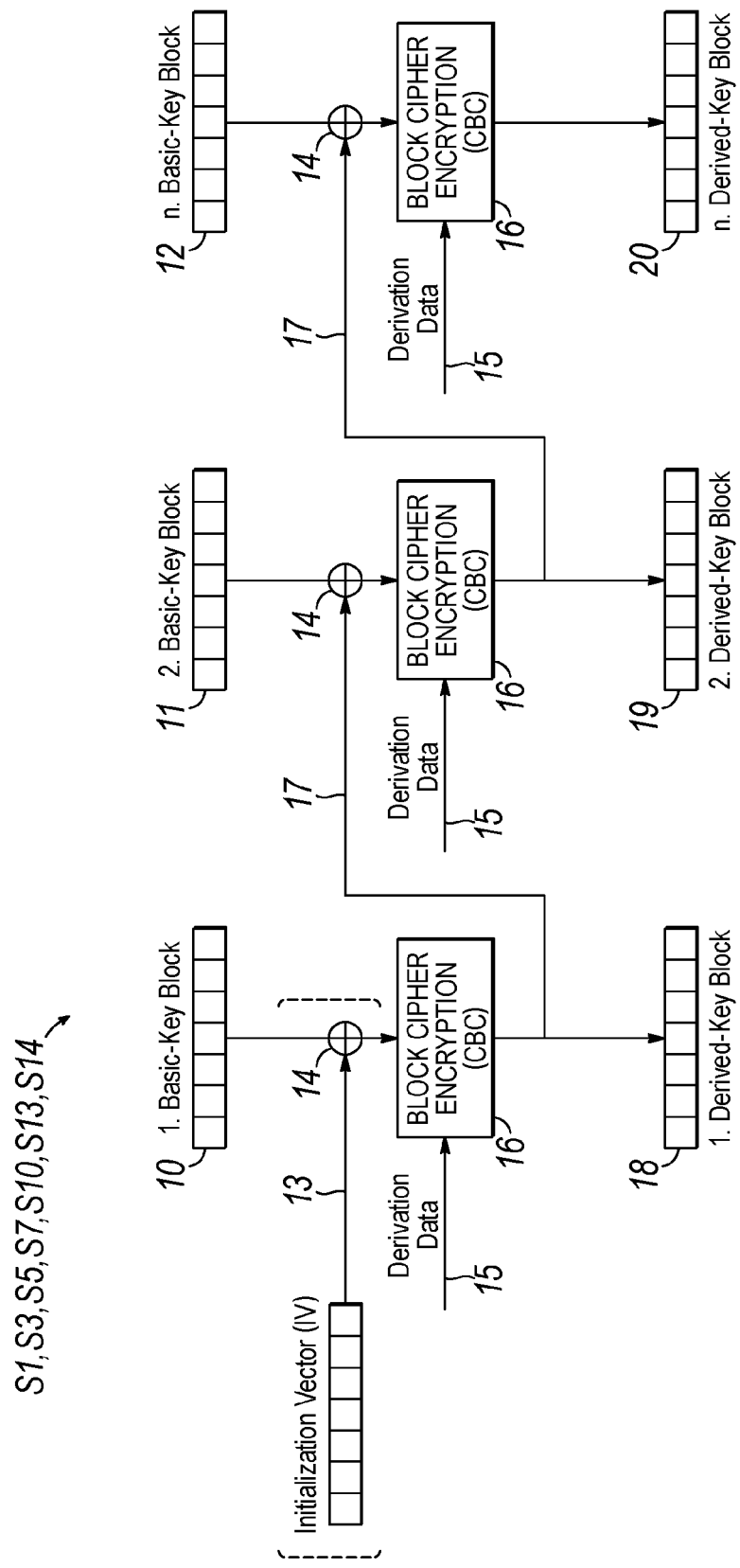
FIG. 2 is a diagrammatic view illustrating an exemplary key-derivation algorithm that generates a new key derived from a basic key.

The terminal provider 5 derives S3 a terminal-specific access key K2 for each payment terminal 1 based on the controlling-entity-specific master-access key K1 and the identification number 44 of the payment terminal 1. The future owner of the payment terminals 1, i.e., the controlling entity 3, can derive S1 the individual terminal-specific access keys K2 in the same way, as both the terminal provider 5 and the controlling entity 3 share the same key derivation algorithm (see FIG. 2). The terminal-specific access key K2 is implanted S4 into the corresponding payment terminal 1 in a secure room at the terminal provider's production facilities.

The above-described way of implantation of the terminal-specific access key K2 into the payment terminal 1 is optional. Various alternative ways for the terminal-specific-access-key implantation are also covered.

The payment provider 2 generates an operator-specific master-transport key K3 and securely transmits S6 the operator-specific master-transport key K3 to the controlling entity 3, for example, by means of an asymmetric encryption algorithm or by a certified courier. This operator-specific master-transport key K3 is unique for each controlling-entity-to-operator relation, i.e., business contract.

The controlling entity 3 derives S7 an operator- and terminal-specific transport key K4 from the operator-specific master-transport key K3 and the terminal-identification number 44 of the payment terminal 1. The payment provider 2 can derive S5 the individual operator- and terminal-specific transport keys K4 in the same way, as both the payment provider 2 and the controlling entity 3 share the same key-derivation algorithm (see FIG. 2).

Figure 6:
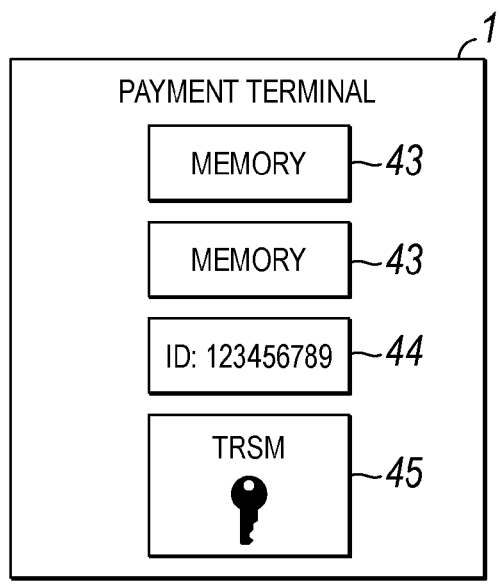
FIG. 6 is a diagrammatic view illustrating a tamper-resistant security module of the payment terminal shown in FIG. 5.

The controlling entity 3 encrypts S8 the individual operator- and terminal-specific transport keys K4 with the corresponding terminal-specific access keys K2 before transmitting the operator- and terminal-specific transport keys K4 to the corresponding payment terminals 1. The controlling entity 3 transmits S9 the operator- and terminal-specific transport keys K4 to the corresponding payment terminals 1. In other words, each operator- and terminal-specific transport key K4 is encrypted S8 by an individual terminal-specific access key K2 corresponding to the same terminal-identification number 44 and can only be decrypted in the corresponding payment terminal 1, which has been loaded S4 with the same terminal-specific access key K2. In some embodiments, the operator- and terminal-specific transport key K4 is decrypted with the corresponding terminal-specific access key K2 upon receipt at the payment terminal 1, and the decrypted operator- and terminal-specific transport key K4 is stored in the payment terminal 1, e.g., in a secure manner, for example in a tamper-resistant security module (TRSM) 45 (FIG. 6).

In an alternative embodiment, the operator- and terminal-specific transport key K4 is not decrypted upon receipt, but is stored still in the encrypted form in the payment terminal 1, and is only decrypted when needed, i.e., it is "decrypted on the fly". In this alternative embodiment, security for the operator- and terminal-specific transport key K4 is provided by keeping it encrypted, rather than by storing it in the unencrypted form in a secure storage, such as a TRSM 45. Hence, in this alternative embodiment the operator- and terminal-specific transport key K4 can optionally be stored in a not secure memory, e.g., a normal memory (for example, a ROM) outside the TRSM 45.

The payment provider 2 generates an operator-specific base-derivation key K5, which is unique for each operator-to-payment-provider relation, i.e., business contract. The payment provider 2 derives S10 an individual operator- and terminal-specific initial-encryption key K6 for each payment terminal 1 from the operator-specific base-derivation key K5 and the terminal-identification number 44 of the payment terminals 1.

The payment provider 2 encrypts S11 the individual operator- and terminal-specific initial-encryption keys K6 with the corresponding operator- and terminal-specific transport keys K4 before transmitting the operator- and terminal-specific initial-encryption keys K6 to the corresponding payment terminals 1. The payment provider 2 transmits S12 the encrypted operator- and terminal-specific initial-encryption keys K6 to the corresponding payment terminals 1. In other words, each operator- and terminal-specific initial-encryption key K6 is encrypted S11 by an individual operator- and terminal-specific transport key K4 corresponding to the same terminal-identification number 6 and can only be decrypted in the corresponding payment terminal 1, which has been fed in S9' with the respective operator- and terminal-specific transport key K4. In some embodiments, the operator- and terminal-specific initial-encryption key K6 is decrypted with the corresponding operator- and terminal-specific transport key K4 upon receipt at the payment terminal 1, and the decrypted operator- and terminal-specific initial-encryption key K6 is stored in the payment terminal 1, e.g., in a secure manner, for example in a tamper-resistant security module (TRSM) 45 (FIG. 6).

In an alternative embodiment, the operator- and terminal-specific initial-encryption key K6 is not decrypted upon receipt, but is stored still in the encrypted form in the payment terminal 1, and is only decrypted when needed, i.e., it is "decrypted on the fly". In this alternative embodiment security for the operator- and terminal-specific initial-encryption key K6 is provided by keeping it encrypted, rather than by storing it in the unencrypted form in a secure storage, such as a TRSM 45. Hence, in this alternative embodiment, the operator- and terminal-specific initial-encryption key K6 can optionally be stored in a not secure memory, e.g., a normal memory (for example, a ROM) outside the TRSM 45.

The payment terminal 1 derives S14 an operator- and transaction-specific encryption key K7 from the operator- and terminal-specific initial-encryption key K6 and the transaction-specific number 27 of an ongoing transaction 26. The payment provider 2 can derive S13 the individual operator- and transaction-specific encryption keys K7 in the same way, as both the payment terminal 1 and the payment provider 2 share the same key derivation algorithm (see FIG. 2).

The operator- and transaction-specific encryption key K7 is the basis for deriving, for example, a PIN-encryption key, sensitive-data-encryption keys, and MAC-signature keys used in the transmission of encrypted data S17 between the payment terminal 1 and the payment provider 2, e.g., currency-transfer operations, authentication requests, or the like, during a transaction 26.

An exemplary key-derivation algorithm, the cipher block chaining (CBC) algorithm described above, is shown in FIG. 2. A basic key having n basic-key blocks 10, 11, 12 is used to create new keys, which are based on the basic key and a derivation data 15, and have n derived-key blocks 18, 19, 20. This derivation data 15 can be a hexadecimal number, based on the terminal-identification number 44 or a transaction-specific number 27, with a length corresponding to the basic key, e.g., double the key length.

A new key is generated, i.e., derived, from the basic key by encrypting all basic-key blocks 10, 11, to 12 with a block cipher encryption 16, which has a given cipher block size. The encryption is sequential and the basic key is padded to a multiple of the cipher block size.

The first basic-key block 10 is XORed 14, i.e., is summed modulo two, with an initialization vector (IV) 13. Without this initialization vector 13, each subsequent derivation of the same first block would yield the same derived block.

Because this algorithm is used for key derivation, based on a terminal- or transaction-specific number 44, 27, and not for data encryption, i.e., the derivation data 15 used for the block cipher encryption 16 changes for each derived key, the XORing of the first basic-key block 10 with an initialization vector 13 is optional.

The second basic-key block 11 is combined 17 with the first derived-key block 18 by XORing 14. Hence, an input of the block cipher encryption 16 is dependent on an output of a preceding block cipher encryption 16. The algorithm is therefore called cipher block chaining (CBC) algorithm. The second basic-key block 11 XORed the first derived-key block 18 yields the second derived-key block 19 after block cipher encryption 16 with the derivation data 15.

This process is repeated until all n basic-key blocks have been XORed with the preceding derived-key block and have been encrypted with the derivation data 15. This way, each derived-key block depends on all basic-key blocks processed up to that point. The resulting derived key has the same length as the basic key. As this derivation is a unique mapping rule, different entities in different locations can derive the same key from the same basic key with the above described algorithm.

Figure 3:
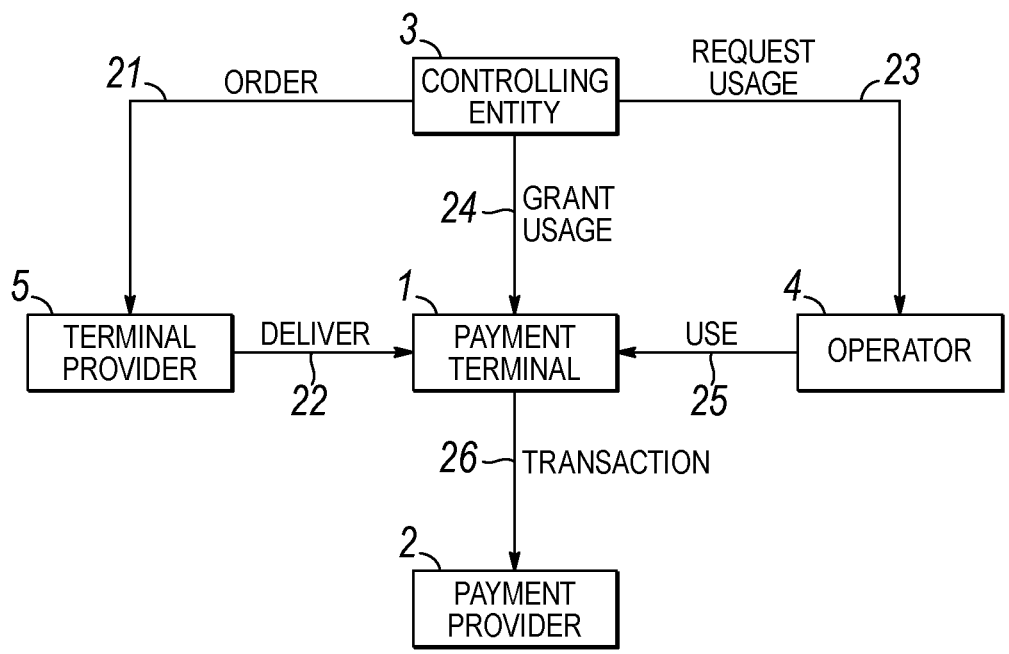
FIG. 3 is a diagrammatic view illustrating functional relationships between the different payment-transaction actors shown in FIG. 1.

Functional relationships and a chronological order of activities (reference signs 21 to 26 in ascending order) for a payment transaction, executed by different payment- and transaction actors, are illustrated for an example shown in FIG. 3.

The controlling entity 1 instructs a terminal provider 5, i.e., a payment terminal manufacturer, to produce the payment terminal 1 by making a business contract, i.e., by ordering 21 the payment terminal 1 from the terminal provider 5.

The terminal provider 5 delivers 22 the payment terminal 1 based on the controlling entity's specifications to the controlling entity 3 on completion of the payment terminal 1. The specifications include, for example, an implanted given access key, e.g., a terminal-specific access key K2, derived from a controlling-entity-specific master-access key K1 and the terminal-identification number 44 of the payment terminal 1.

After delivery 22 of the payment terminal 1 to the controlling entity 3, an operator 4 can request usage 23 of the payment terminal 1. The operator can, for example, rent the payment terminal 1 from the controlling entity 3 for the duration of a business contract.

Once the controlling entity 3 grants the operator 4 the right to use payment terminal 1 (the grant being labeled as 24) an operator- and terminal-specific transport key K4 is injected S9' into the payment terminal 1 by the controlling entity 3. The operator- and terminal-specific transport key K4 is individually chosen for the operator 4 and enables the operator 4 to operate the payment terminal 1.

The payment terminal 1 can then be used 25 by the operator 4 to perform transactions 26 with one or more payment providers 2, i.e., acquirers of the operator 4. During these transactions 26 encrypted transmissions of sensitive data S17 are exchanged between the payment terminal 1 and a payment provider 2.

Figure 4:
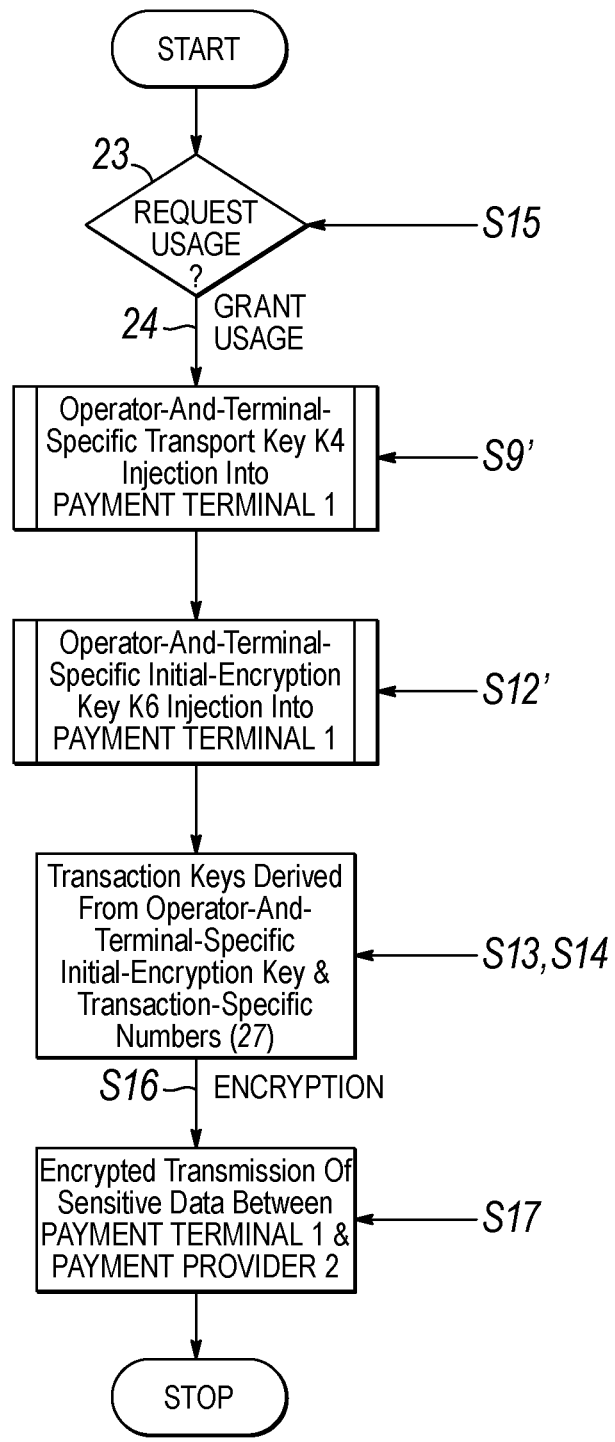
FIG. 4 is a flowchart illustrating key exchanges for an encrypted data transmission.

Exemplary activities to prepare a payment transaction 26 at a check-in desk are shown in FIG. 4. At S15 usage of the payment terminal 1 is first of all requested at 23 by an operator 4, e.g., when the operator 4 opens a contractual relationship with the controlling entity 3.

If usage of the payment terminal 1 is granted at 24 by the controlling entity 3 of the airport to the operator 2, an operator- and terminal-specific transport key K4 is fed into the payment terminal S9'.

The operator- and terminal-specific transport key K4 is symmetrically encrypted S8 with a terminal-specific access key K2, where both keys are derived S1, S7 with the same terminal-identification number 44. The injection of the operator- and terminal-specific transport key K4, labeled as S9' in FIG. 4, involves transmitting S9 the symmetrically encrypted operator- and terminal-specific transport key K4 from the controlling entity 3 to the payment terminal 1. In some embodiments, the key injection S9' also involves decrypting the encrypted operator- and terminal-specific transport key K4 with the terminal-specific access key K2, which was previously stored in the payment terminal 1, e.g., during production, and storing of the operator- and terminal-specific transport key K4 within the payment terminal 1 upon decryption, e.g., in a secure manner. In other embodiments, the decryption of the operator- and terminal-specific transport key K4 may be deferred until the decrypted operator- and terminal-specific transport key K4 is actually needed. It can therefore be stored in a not secure manner. The activity of decrypting the encrypted operator- and terminal-specific transport key K4 with the stored terminal-specific access key K2 in the payment terminal 1 "on the fly" will then form part an initial part of the decryption of the encrypted operator- and terminal-specific initial-encryption key K6 described below.

As the name suggests, the operator- and terminal-specific transport key K4 is used for transportation of another encryption key in a confidentiality-securing manner, i.e., encryption. An operator- and terminal-specific initial-encryption key K6 is fed into the payment terminal S12', which is the basis for transaction-related encryption keys.

The operator- and terminal-specific initial-encryption key K6 is symmetrically encrypted S11 with the operator- and terminal-specific transport key K4, where both keys are derived S7, S10 with the same terminal-identification number 44. The injection of the operator- and terminal-specific initial-encryption key K6, labeled as S12' in FIG. 4, involves transmitting S12 the symmetrically encrypted operator- and terminal-specific initial-encryption key K6 from the payment provider 2 to the payment terminal 1. In some embodiments, the key injection S12' also involves decrypting the encrypted operator- and terminal-specific initial-encryption key K6 with the decrypted operator- and terminal-specific transport key K4 in the payment terminal 1, and storing of the operator- and terminal-specific initial-encryption key K6 upon decryption within the payment terminal 1, e.g., in a secure manner. In other embodiments, the decryption of the encrypted operator- and terminal-specific initial-encryption key K6 may be deferred until the decrypted operator- and terminal-specific initial-encryption key K6 is actually needed. It can therefore be stored in a not secure manner. The activity of decrypting the encrypted operator- and terminal-specific initial-encryption key K6 with the operator- and terminal-specific transport key K4 decrypted in the payment terminal 1 "on the fly" will then form part of the derivation S14 of the operator- and transaction-specific encryption key K7 described below.

At a certain stage, there will be a need to start doing some transactions with the payment terminal 1 for one of the operators 4. For example, in the case of shared airport's kiosks, a customer would select the airline at issue (=operator 4) on the kiosk's screen; and in the case of shared check-in workstations an airline's agent (=operator's 4 agent) would log in at the payment terminal to start the check-in for the flight.

As a first sub-process, the operator- and terminal-specific initial-encryption key K6 associated with the operator 4 (e.g., the airline) at issue is selected, depending on the operator associated with the customer or the agent performing the transaction.

In some optional embodiments, the payment terminal 1 provides more than one usage modes, or more than one type of "device behavior". The payment terminal 1 is arranged to provide the various types of device behavior. In these embodiments, as a further optional sub-process, when use of the payment terminal 2 is started to perform a transaction, the device behavior associated with the operator at issue is automatically and dynamically selected. For example, two different usage modes may be provided in some embodiments: A "direct-usage mode" and a "delegated-usage mode". In the direct-usage mode the payment terminal 1 is initialized to return all payment data back to an operator application over a serial connection to the operator 4; it is then up to the operator application to transmit the data to the payment provider 2. In the delegated usage-mode, the payment terminal 1 is initialized to establish a direct connection over a network interface providing access to a wide-area network (WAN) to the payment provider 2. In embodiments in which the payment terminal 1 is to provide the delegated-usage mode, the payment terminal 1 is therefore equipped with a suitable network interface, and the payment terminal 1 is pre-configured with network parameters (such as IP, DNS, DHCP, Firewalls, VPN, . . . ) suitable to communicate directly with the payment provider 2 over the WAN. If the delegated-usage mode is selected, a TCP/IP connection is established to the payment provider's host, and all further configuration messages will be initiated by the payment provider's host using this connection.

The below exemplary XML code shows an example of the initialization of the delegated mode. It can be seen from the exemplary XML code that the automatic selection is controlled by a variable named "<usageMode>" which, in this example, can take the values "delegated" and "direct":

```
<?xml version="1.0"?>
<operatorUsageRequest>
    <operatorCode>M1</operatorCode>
    <paymentProviderCode>P1</paymentProviderCode>
    <usageMode>delegated</usageMode>
    <networkParameters>
        <host>payment.com</host>
        <port>1234</port>
        ...
    </networkParameters>
    <authenticationData>66678d4f0ea8bda1</authenticationData>
</operatorUsageRequest>
```

As another sub-process, after the operator- and terminal-specific initial-encryption key K6 has been obtained and decrypted at the payment terminal 1 (either in advance, or "on the fly" during the initialization-of-a-transaction stage), transaction keys for further transaction activities can be derived from the decrypted operator- and terminal-specific initial-encryption key K6 using a transaction-specific number 27, which is labeled as S14 in FIG. 4. As indicated by the labeling, the derivation S14 of the operator- and transaction-specific encryption key K7 from the operator- and terminal-specific initial-encryption key K6 by the payment terminal 1 using the transaction-specific number 27 is one of these transaction keys. The derivation is performed in an analogous manner at the payment provider 2, there labeled as S13.

Additional transaction keys, derived from the operator- and transaction-specific encryption key K7 using the transaction-specific number 27 or another transaction-specific number, e.g., a PIN-encryption key, sensitive-data-encryption keys, and MAC-signature keys, are also covered by the activity labeled S13, S14 in FIG. 4.

In FIG. 4, in embodiments in which the payment terminal 1 has an optional usage-mode functionality, the label S14 also represents the optional activity of the operator-dependent selection of the usage mode (e.g., the selection of the direct-usage mode or the delegated-usage mode).

Those additional transaction keys are used for encrypting S16 sensitive data for transmission between the payment terminal 1 and the payment provider 2, e.g., a PIN for an account that is to be debited.

Hence, the actual encrypted transmission of sensitive data S17 of the payment transaction 26 between the payment terminal 1 and the payment provider 2 can be performed using the above-mentioned transaction keys.

Figure 5:
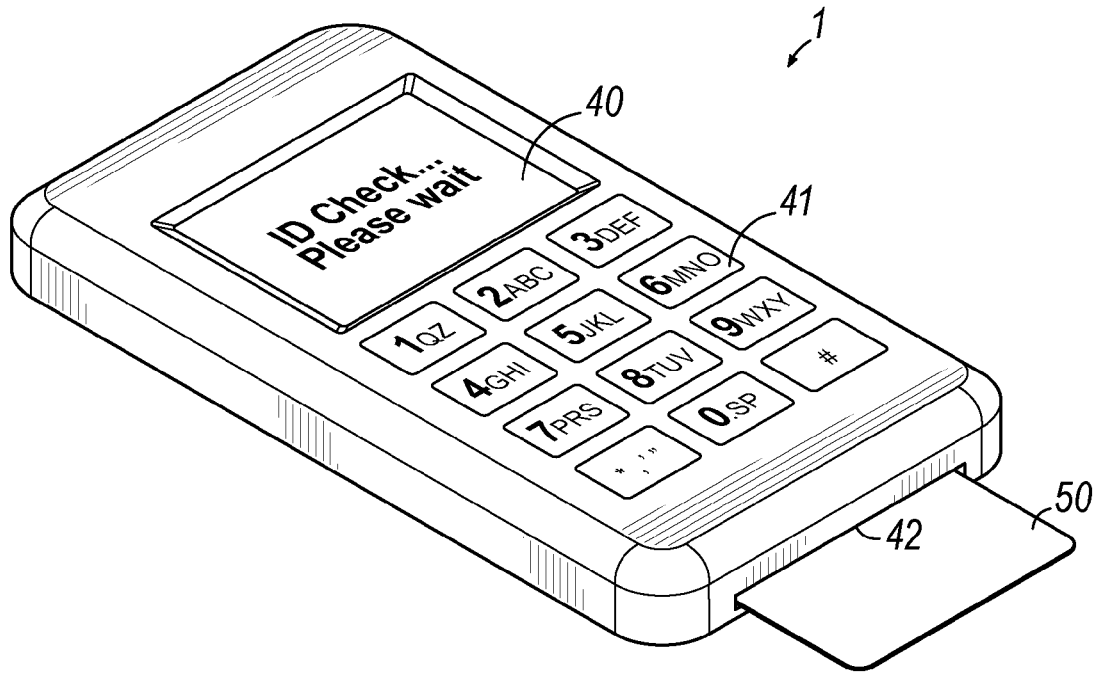
FIG. 5 is a perspective view of an exemplary payment terminal for payment cards.

An exemplary payment terminal 1, on which the key injections labeled S9' and S12' in FIG. 4 and described in conjunction with FIG. 1 and FIG. 4 are performed, is illustrated in FIG. 5.

The payment terminal 1 shown in FIG. 5 has a PIN pad 41 to accept and encrypt a cardholder's personal identification number (PIN). The PIN pad 41 utilizes access to a payment card 50 (in the case of a chip card) and allows secure entering of the PIN into the payment terminal 1 and subsequent encryption of the PIN by the payment terminal 1.

The PIN is encrypted immediately upon entry and an encrypted PIN block is created. This encrypted PIN block is erased as soon as it has been sent from the PIN pad 41 to the attached payment terminal 1 and/or the chip card 50. The PINs are encrypted using a triple DES algorithm.

The payment terminal 1 is equipped with a display 40 to show relevant data to both the customer, e.g., a passenger, and the operator 4, as for example, a payment-order amount or an authentication status of the entered PIN.

Additionally, the payment terminal 1 is equipped with a payment-card slit reader 42, where the payment card 50 is inserted into the payment terminal 1 and card data is read from the payment card 50, e.g., for verification of the customer's identity, i.e., checking whether the customer can provide the correct PIN for the payment card 50.

In alternative embodiments, the payment terminal 1 may be equipped with a payment-card swipe reader in addition, or as an alternative, to the payment-card slit reader 42. In these alternative embodiments, the card data is read from the payment card 50 by swiping the payment card 50 to a swipe-reader's slit.

FIG. 6 depicts additional features of the exemplary payment terminal 1 illustrated in FIG. 5. The payment terminal 1 has a memory 43 and a tamper-resistant security module (TRSM) 45. The TRSM 45 can be a logical partition of the memory 43 or can, alternatively, be an individual secure-reading-and-exchange-of-data (SRED) module, on which the individual terminal-specific access, transport, and encryption the key K2, and optionally the encryption keys K4, and K6 are stored. The memory 43 includes a non-volatile memory where executable program code, e.g., compiled C code, and/or interpretable script code is stored.

The payment terminal's unique terminal-identification number 44 is embossed on the housing of the payment terminal 1. In an alternative embodiment of the payment terminal 1, the terminal-identification number 44 is stored on the memory 43 and can be read out by authorized parties. Thereby, the terminal-identification number 44 is not visible to anyone without clearance.

Figure 7:
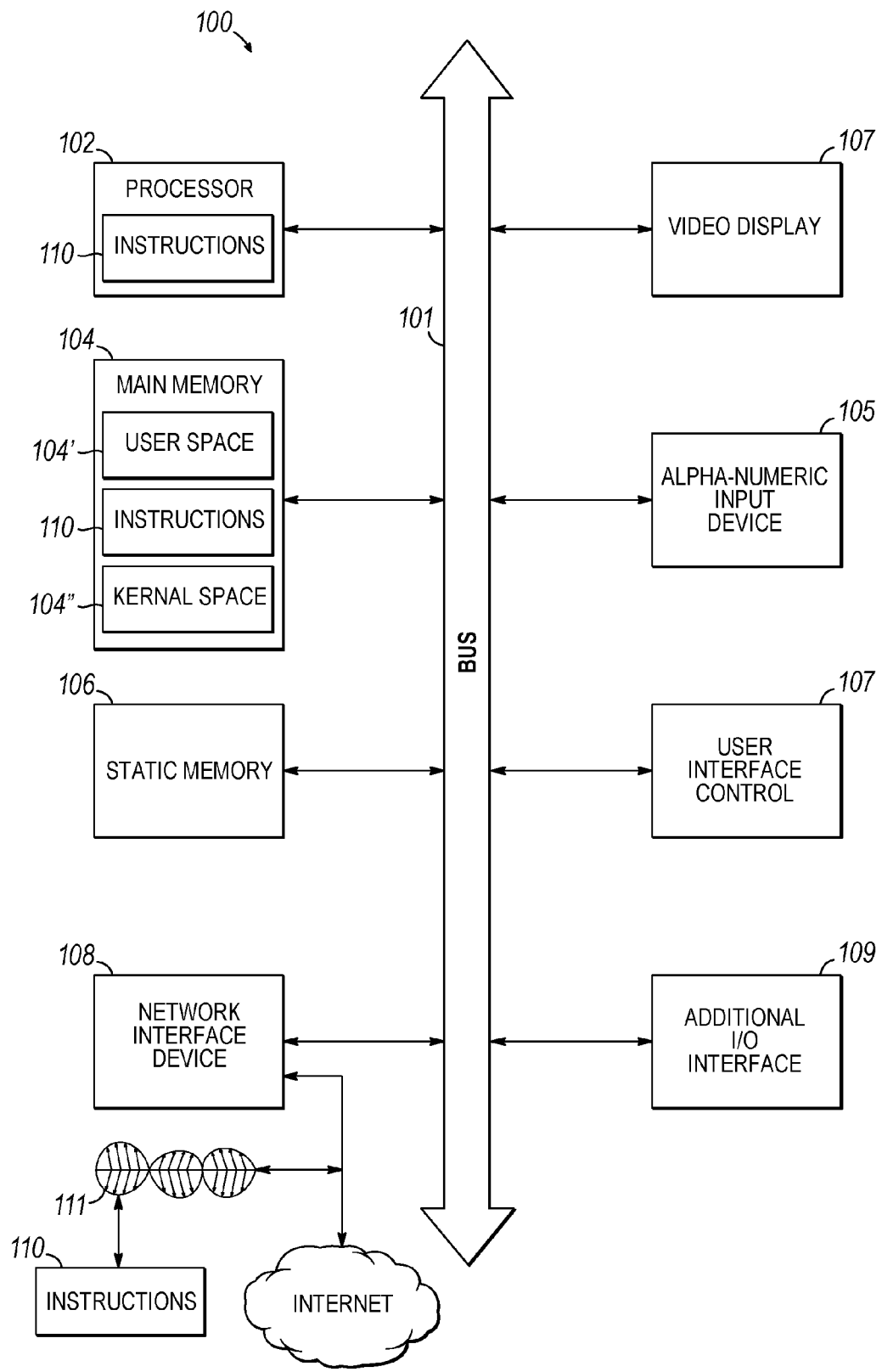
FIG. 7 is a diagrammatic view of an exemplary computer system, according to the controlling-entity system and the payment-provider system described herein, arranged to configure the payment terminal.

A diagrammatic representation of an exemplary computer system 100 arranged to execute a set of instructions 110, to cause the computer system to perform any of the methodologies used for configuration of a payment terminal 1 for a payment transaction 26, as described herein, is shown in FIG. 7. The computerized controlling-entity system and the computerized payment-provider system may be such a computer system 100.

The computer system 100 includes a processor 102, a main memory 104 and a network interface 108. The main memory 104 includes a user space 104', which is associated with user-run applications, and a kernel space 104", which is reserved for operating-system- and hardware-associated applications. The computer system 100 further includes a static memory 106, e.g., non-removable flash and/or solid state drive and/or a removable Micro or Mini SD card, which permanently stores software enabling the computer system 100 to execute functions of the computer system 100. Furthermore, it may include a video display 103, a user interface control module 107 and/or an alpha-numeric and cursor input device 105. Optionally, additional I/O interfaces 109, such as card reader and USB interfaces may be present. The computer system components 102 to 109 are interconnected by a data bus 101.

In some exemplary embodiments the software programmed to carry out the method of configuring the payment terminal 1 discussed herein is stored on the static memory 106; in other exemplary embodiments external databases are used. The method of configuring the payment terminal 1 discussed herein is performed via the network interface device 108.

An executable set of instructions (i.e., software) 110 embodying any one, or all, of the methodologies described above, resides completely, or at least partially, permanently in the non-volatile memory 106. When the instructions are executed, process data resides in the main memory 104 and/or the processor 102. The software 110 may further be transmitted or received as a propagated signal 111 through the network interface device 108 from/to a software server within a local area network or the Internet.

All publications and existing systems mentioned in this specification are herein incorporated by reference.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of configuring a payment terminal to be shared by a plurality of operators with cryptographic segregation between different operators, the method comprising:

transmitting a master-transport key from a payment provider to a controlling entity associated with the payment terminal in a confidentiality-secured manner;

deriving, both at the payment provider and at the controlling entity, a transport key from the master-transport key using an identification number of the payment terminal;

symmetrically encrypting, by the controlling entity, the transport key using an access key specific to the payment terminal;

transmitting the encrypted transport key to the payment terminal, wherein the controlling entity controls usage of the payment terminal in an operator-selective manner by the transmission of the encrypted transport key, and the master-transport key is specific to one of the operators;

decrypting the encrypted transport key at the payment terminal with the access key;

deriving, by the payment provider, a first encryption key from a base-derivation key using the identification number of the payment terminal;

symmetrically encrypting the first encryption key with the transport key;

transmitting the encrypted first encryption key to the payment terminal;

decrypting the encrypted first encryption key at the payment terminal with the decrypted transport key; and deriving, both at the payment provider and at the payment terminal, a second encryption key from the first encryption key using a transaction-specific number associated with a payment transaction, when performing the payment transaction with the payment terminal, wherein the transport key, the first encryption key, and the second encryption key are specific to one of the operators and to the payment terminal, and the base-derivation key is specific to one of the operators.

2. The method of claim 1 wherein decrypting the encrypted transport key at the payment terminal with the access key comprises:

decrypting the encrypted transport key with the access key at the payment terminal upon receipt, and storing the decrypted transport key in a secure storage of the payment terminal; or storing the encrypted transport key at the payment terminal, and decrypting the stored encrypted transport key with the access key at the payment terminal when the decrypted transport key is required for the decryption of the encrypted first encryption key to perform the payment transaction with the payment terminal.

3. The method of claim 1 wherein decrypting the encrypted first encryption key at the payment terminal with the decrypted transport key comprises:
   decrypting the encrypted first encryption key with the decrypted transport key at the payment terminal upon receipt or input, and storing the decrypted first encryption key in a secure storage of the payment terminal; or
   storing the encrypted first encryption key at the payment terminal upon receipt or input, and decrypting the stored encrypted first encryption key with the decrypted transport key at the payment terminal when the decrypted first encryption key is required for obtaining the second encryption key using the decrypted first encryption key to perform the payment transaction with the payment terminal.

4. The method of claim 1 further comprising:
   providing a first usage mode in which transaction data is exchanged between the payment terminal and one of the operators;
   providing a second usage mode in which transaction data is exchanged between the payment terminal and the payment provider;
   assigning either the first usage mode or the second usage mode to each of the plurality of operators;
   upon one of the operators of the plurality of operators starting to use the payment terminal, automatically selecting the first usage mode or the second based upon an identity of the operator; and
   performing the transaction at the payment terminal using the first usage mode or the second usage mode that is automatically selected.

5. The method of claim 1 further comprising:
   deriving the access key used by the controlling entity for symmetric encryption from a master-access key specific to the controlling entity using the identification number of the payment terminal.

6. The method of claim 1 further comprising:
   receiving the access key at the payment terminal from a terminal provider in a confidentiality-secured manner; and
   storing the access key at the payment terminal.

7. The method of claim 6 further comprising:
   deriving the access key, by the terminal provider, from a master-access key specific to the controlling entity based upon the identification number of the payment terminal; and
   transmitting the master-access key from the controlling entity to the terminal provider in a confidentiality-secured manner.

8. A method of configuring a payment terminal to be shared by a plurality of operators with cryptographic segregation between different operators, the method comprising:
   deriving, at a payment provider, a transport key from a master-transport key using an identification number of the payment terminal;
   transmitting the transport key from the payment provider to a controlling entity associated with the payment terminal in a confidentiality-secured manner;
   symmetrically encrypting, by the controlling entity, the transport key with an access key;
   transmitting the encrypted transport key to the payment terminal, wherein the controlling entity controls usage of the payment terminal in an operator-selective manner by the transmission of the encrypted transport key, and the master-transport key is specific to one of the operators;
   decrypting the encrypted transport key at the payment terminal with the access key;
   deriving, by the payment provider, a first encryption key from a base-derivation key using the identification number of the payment terminal;
   symmetrically encrypting the first encryption key with the transport key;
   transmitting the encrypted first encryption key to the payment terminal;
   decrypting the encrypted first encryption key at the payment terminal with the decrypted transport key; and
   deriving, both at the payment provider and at the payment terminal, a second encryption key from the first encryption key using a transaction-specific number associated with a payment transaction, when performing the payment transaction with the payment terminal,
   wherein the transport key, the first encryption key, and the second encryption key are specific to one of the operators and to the payment terminal, and the base-derivation key is specific to one of the operators.

9. A method of configuring a payment terminal to be shared by a plurality of operators with cryptographic segregation between different operators, the method comprising:
   receiving an encrypted transport key as manual input into the payment terminal, wherein a controlling entity controls usage of the payment terminal in an operator-selective manner based upon the transport key;
   decrypting the encrypted transport key at the payment terminal with an access key;
   deriving, by a payment provider, a first encryption key from a base-derivation key using an identification number of the payment terminal;
   symmetrically encrypting the first encryption key with the transport key;
   transmitting the encrypted first encryption key to the payment terminal;
   decrypting the encrypted first encryption key at the payment terminal with the decrypted transport key; and
   deriving, both at the payment provider and at the payment terminal, a second encryption key from the first encryption key using a transaction-specific number associated with a payment transaction, when performing the payment transaction with the payment terminal,
   wherein the transport key, the first encryption key, and the second encryption key are specific to one of the operators and to the payment terminal, and the base-derivation key is specific to one of the operators.

10. A system for configuring a payment terminal to be shared by a plurality of operators with cryptographic segregation between different operators, the system comprising:
    at least one processor; and
    a memory coupled to the at least one processor, the memory including program code configured to be executed by the at least one processor to cause the system to:
        transmit a master-transport key from a payment provider to a controlling entity associated with the payment terminal in a confidentiality-secured manner;
        derive, both at the payment provider and at the controlling entity, a transport key from the master-transport key using an identification number of the payment terminal;

symmetrically encrypt, by the controlling entity, the transport key using an access key specific to the payment terminal;

transmit the encrypted transport key to the payment terminal, wherein the controlling entity controls usage of the payment terminal in an operator-selective manner by the transmission of the encrypted transport key, and the master-transport key is specific to one of the operators;

decrypt the encrypted transport key at the payment terminal with the access key;

derive, by the payment provider, a first encryption key from a base-derivation key using the identification number of the payment terminal;

symmetrically encrypt the first encryption key with the transport key;

transmit the encrypted first encryption key to the payment terminal;

decrypt the encrypted first encryption key at the payment terminal with the decrypted transport key; and derive, both at the payment provider and at the payment terminal, a second encryption key from the first encryption key using a transaction-specific number associated with a payment transaction, when performing the payment transaction with the payment terminal, wherein the transport key, the first encryption key, and the second encryption key are specific to one of the operators and to the payment terminal, and the base-derivation key is specific to one of the operators.

11. The system of claim 10 wherein the program code configured to be executed by the at least one processor to cause the system to decrypt the encrypted transport key at the payment terminal with the access key comprises:

program code configured to be executed by the at least one processor to cause the system to:

decrypt the encrypted transport key with the access key at the payment terminal upon receipt, and store the decrypted transport key in a secure storage of the payment terminal; or store the encrypted transport key at the payment terminal, and decrypt the stored encrypted transport key with the access key at the payment terminal when the decrypted transport key is required for the decryption of the encrypted first encryption key to perform the payment transaction with the payment terminal.

12. The system of claim 10 wherein the program code configured to be executed by the at least one processor to cause the system to decrypt the encrypted first encryption key at the payment terminal with the decrypted transport key comprises:

program code configured to be executed by the at least one processor to cause the system to:

decrypt the encrypted first encryption key with the decrypted transport key at the payment terminal upon receipt or input, and store the decrypted first encryption key in a secure storage of the payment terminal; or store the encrypted first encryption key at the payment terminal upon receipt or input, and decrypt the stored encrypted first encryption key with the decrypted transport key at the payment terminal when the decrypted first encryption key is required for obtaining the second encryption key using the decrypted first encryption key to perform the payment transaction with the payment terminal.

13. The system of claim 10 further comprising program code configured to be executed by the at least one processor to cause the system to:

provide a first usage mode in which transaction data is exchanged between the payment terminal and one of the operators;

provide a second usage mode in which transaction data is exchanged between the payment terminal and the payment provider;

assign either the first usage mode or the second usage mode to each of the plurality of operators;

upon one of the operators of the plurality of operators starting to use the payment terminal, automatically select the first usage mode or the second based upon an identity of the operator; and perform the transaction at the payment terminal using the first usage mode or the second usage mode that is automatically selected.

14. The system of claim 10 further comprising program code configured to be executed by the at least one processor to cause the system to:

derive the access key used by the controlling entity for symmetric encryption from a master-access key specific to the controlling entity using the identification number of the payment terminal.

15. The system of claim 10 further comprising program code configured to be executed by the at least one processor to cause the system to:

receive the access key at the payment terminal from a terminal provider in a confidentiality-secured manner; and store the access key at the payment terminal.

16. The system of claim 15 further comprising program code configured to be executed by the at least one processor to cause the system to:

derive the access key, by the terminal provider, from a master-access key specific to the controlling entity based upon the identification number of the payment terminal; and transmit the master-access key from the controlling entity to the terminal provider in a confidentiality-secured manner.

17. A system for configuring a payment terminal to be shared by a plurality of operators with cryptographic segregation between different operators, the system comprising:

at least one processor; and a memory coupled to the at least one processor, the memory including program code configured to be executed by the at least one processor to cause the system to:

derive, at a payment provider, a transport key from a master-transport key using an identification number of the payment terminal;

transmit the transport key from the payment provider to a controlling entity associated with the payment terminal in a confidentiality-secured manner;

symmetrically encrypt, by the controlling entity, the transport key with an access key;

transmit the encrypted transport key to the payment terminal, wherein the controlling entity controls usage of the payment terminal in an operator-selective manner by the transmission of the encrypted transport key, and the master-transport key is specific to one of the operators;

decrypt the encrypted transport key at the payment terminal with the access key;

derive, by the payment provider, a first encryption key from a base-derivation key using the identification number of the payment terminal;

symmetrically encrypt the first encryption key with the transport key;

transmit the encrypted first encryption key to the payment terminal;

decrypt the encrypted first encryption key at the payment terminal with the decrypted transport key; and derive, both at the payment provider and at the payment terminal, a second encryption key from the first encryption key using a transaction-specific number associated with a payment transaction, when performing the payment transaction with the payment terminal, wherein the transport key, the first encryption key, and the second encryption key are specific to one of the operators and to the payment terminal, and the base-derivation key is specific to one of the operators.

18. A system for configuring a payment terminal to be shared by a plurality of operators with cryptographic segregation between different operators, the system comprising:

at least one processor; and a memory coupled to the at least one processor, the memory including program code configured to be executed by the at least one processor to cause the system to:

receive an encrypted transport key as manual input into the payment terminal, wherein a controlling entity controls usage of the payment terminal in an operator-selective manner based upon the transport key;

decrypt the encrypted transport key at the payment terminal with an access key;

derive, by a payment provider, a first encryption key from a base-derivation key using an identification number of the payment terminal;

symmetrically encrypt the first encryption key with the transport key;

transmit the encrypted first encryption key to the payment terminal;

decrypt the encrypted first encryption key at the payment terminal with the decrypted transport key; and derive, both at the payment provider and at the payment terminal, a second encryption key from the first encryption key using a transaction-specific number associated with a payment transaction, when performing the payment transaction with the payment terminal, wherein the transport key, the first encryption key, and the second encryption key are specific to one of the operators and to the payment terminal, and the base-derivation key is specific to one of the operators.

19. A computer program product for configuring a payment terminal to be shared by a plurality of operators with cryptographic segregation between different operators, the computer program product comprising:

a non-transitory computer readable storage medium; and instructions stored on the non-transitory computer readable storage medium that, when executed by a processor, cause the processor to:

transmit a master-transport key from a payment provider to a controlling entity associated with the payment terminal in a confidentiality-secured manner;

derive, both at the payment provider and at the controlling entity, provide a transport key from the master-transport key using an identification number of the payment terminal;

symmetrically encrypt, by the controlling entity, the transport key using an access key specific to the payment terminal;

transmit the encrypted transport key to the payment terminal, wherein the controlling entity controls usage of the payment terminal in an operator-selective manner by the transmission of the encrypted transport key, and the master-transport key is specific to one of the operators;

decrypt the encrypted transport key at the payment terminal with the access key;

derive, by the payment provider, a first encryption key from a base-derivation key using the identification number of the payment terminal;

symmetrically encrypt the first encryption key with the transport key;

transmit the encrypted first encryption key to the payment terminal;

decrypt the encrypted first encryption key at the payment terminal with the decrypted transport key; and derive, both at the payment provider and at the payment terminal, a second encryption key from the first encryption key using a transaction-specific number associated with a payment transaction, when performing the payment transaction with the payment terminal, wherein the transport key, the first encryption key, and the second encryption key are specific to one of the operators and to the payment terminal, and the base-derivation key is specific to one of the operators.

* * * * *